(12) United States Patent
Rangapuram et al.

(10) Patent No.: US 10,678,652 B1
(45) Date of Patent: Jun. 9, 2020

(54) IDENTIFYING CHANGED FILES IN INCREMENTAL BLOCK-BASED BACKUPS TO BACKUP INDEXES

(71) Applicant: EMC IP Holding Company LLC, Hopkinton, MA (US)

(72) Inventors: Ravi Rangapuram, Bangalore (IN); Pavan Kumar Dattatreya Ati, Bangalore (IN); Sridhar Surampudi, Rajahmundry (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 522 days.

(21) Appl. No.: 15/581,163

(22) Filed: Apr. 28, 2017

(51) Int. Cl.
*G06F 16/00* (2019.01)
*G06F 11/14* (2006.01)
*G06F 16/13* (2019.01)
*G06F 16/14* (2019.01)

(52) U.S. Cl.
CPC .......... *G06F 11/1451* (2013.01); *G06F 16/13* (2019.01); *G06F 16/148* (2019.01); *G06F 2201/84* (2013.01)

(58) Field of Classification Search
CPC ............. G06F 11/1451; G06F 2201/84; G06F 11/1464; G06F 11/1453; G06F 11/1469; G06F 16/2358; G06F 2201/815; G06F 3/0619; G06F 3/065; G06F 3/0683; G06F 11/1435; G06F 11/1446; G06F 2201/80; G06F 11/1456; G06F 11/1458; G06F 16/128; G06F 11/1402; G06F 11/1448; G06F 11/1471; G06F 11/1484; G06F 12/16; G06F 16/1865; G06F 16/2365; G06F 16/27; G06F 16/955
See application file for complete search history.

(56) References Cited

U.S. PATENT DOCUMENTS 7,831,789 B1 * 11/2010 Per ..................... G06F 11/1451
707/625
9,158,804 B1   10/2015 Rangapuram et al.

* cited by examiner

*Primary Examiner* — Yicun Wu
(74) *Attorney, Agent, or Firm* — Staniford Tomita LLP

(57) ABSTRACT

Embodiments are directed to a method of identifying changed files in incremental block based backups, by obtaining changed data blocks of a file from a change block tracking (CBT) driver, wherein the file has an associated master file table (MFT) record and a parent MFT record number used in a file system, and constructing a complete file path of the file by traversing from the changed MFT record to the root directory using respective parent MFT record numbers by iteratively parsing each record by extracting the file name and parent MFT record number and appending the file name to a previous MFT record file name.

20 Claims, 5 Drawing Sheets

IDENTIFYING CHANGED FILES IN INCREMENTAL BLOCK-BASED BACKUPS TO BACKUP INDEXES

TECHNICAL FIELD

Embodiments are generally directed to networked-based data backup methods, and more specifically to identifying changed files in incremental block-based backups.

COPYRIGHT NOTICE

A portion of the disclosure of this patent document contains material that is subject to copyright protection. The copyright owner has no objection to the facsimile reproduction by anyone of the patent disclosure, as it appears in the Patent and Trademark Office patent files or records, but otherwise reserves all copyright rights whatsoever.

BACKGROUND

In standard computer systems, the file system (e.g., NTFS on Windows or ext3 for Linux) is responsible for keeping track of the tree or hierarchy of files. It also stores files in fixed-size blocks on the disk and keeps track of where these blocks are located. Backup applications that read files using the file system to access data are inherently slow. Block based backups (BBB) bypass files and file systems by reading directly from the disk or volume, thus they incur no performance penalty for even large numbers of files because the backup application reads blocks in their order on the disk, not the order that they appear in files. Block based backups also support point-in-time snapshots in which a backup is started by first taking a snapshot of the live running volume. They then read block level data from the snapshot not the actual disk. In general, block-based backups are many times faster for backup and restore operations, as compared to traditional file system based backup systems. The performance increase is due (at least in part) by the fact that incremental backups are created using Changed Block Tracking (CBT), the backups are image based and there is no walking of the file system, plus no indexing is required. During recovery, the file system is virtually mounted, making the recovery very fast and efficient.

The advent of virtualization technology has led to the increased use of virtual machines as data storage targets. Virtual machine (VM) disaster recovery systems using hypervisor platforms, such as vSphere from VMware or Hyper-V from Microsoft, among others, have been developed to provide recovery from multiple disaster scenarios including total site loss. One popular backup system, such as the EMC Networker Block Based Solution creates a backup image in VHDx containers. VHDx is a Hyper-V virtual hard disk (VHD) format found in Windows servers; and has a present storage capacity of 64 TB compared to standard VHD storage limits of 2 TB. A container is an image file that stores backups.

With respect to block based backups and virtualization, full backups contain used blocks of the volume in the VHDx container. Incremental backups contain changed blocks embedded in the VHDx container. To obtain the changed blocks for incremental backups, systems use a CBT driver that monitors all the disks to see if any block is updated. If the block is updated, it will note that block number and block offset. When the user triggers an incremental backup, the Networker backup system consults the driver to obtain the changed blocks and backups only these changed blocks. The system does not backup the file indexes to the device; instead, when a file recovery is triggered it mounts and allows the user to select files. Without mounting the files, the user will not be able to tell which files were backed up and which were not. This is can be a significant issue for system performance, as data searches require remounting the file system.

Suppose, for example, that a user wants to search for a file/folder across all the storage nodes that have backup of all the clients pertaining to a particular department. Current block based backup systems do not allow this as they do not backup file indexes. The only way to perform this operation is to mount all the savesets to make the search. This is essentially a brute-force method that requires a great deal of time and overhead expense. One prior solution tries to identify all the changed files from changed blocks for incremental backups, but this requires the source machine that is to be backed up to be mounted on the proxy machine. This solution also applies for virtual machines hosted by VMware, but requires the use of a designated proxy that acts as Networker client.

What is needed, therefore, is a block based backup system that backs up file indexes and so eliminates the need to traverse and mount all the data savesets to allow the user to perform a search operation.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions. EMC, Networker, Data Domain, Data Domain Restorer, and Data Domain Boost are trademarks of EMC Corporation.

BRIEF DESCRIPTION OF THE DRAWINGS

In the following drawings like reference numerals designate like structural elements. Although the figures depict various examples, the one or more embodiments and implementations described herein are not limited to the examples depicted in the figures.

DETAILED DESCRIPTION

Figure 1:
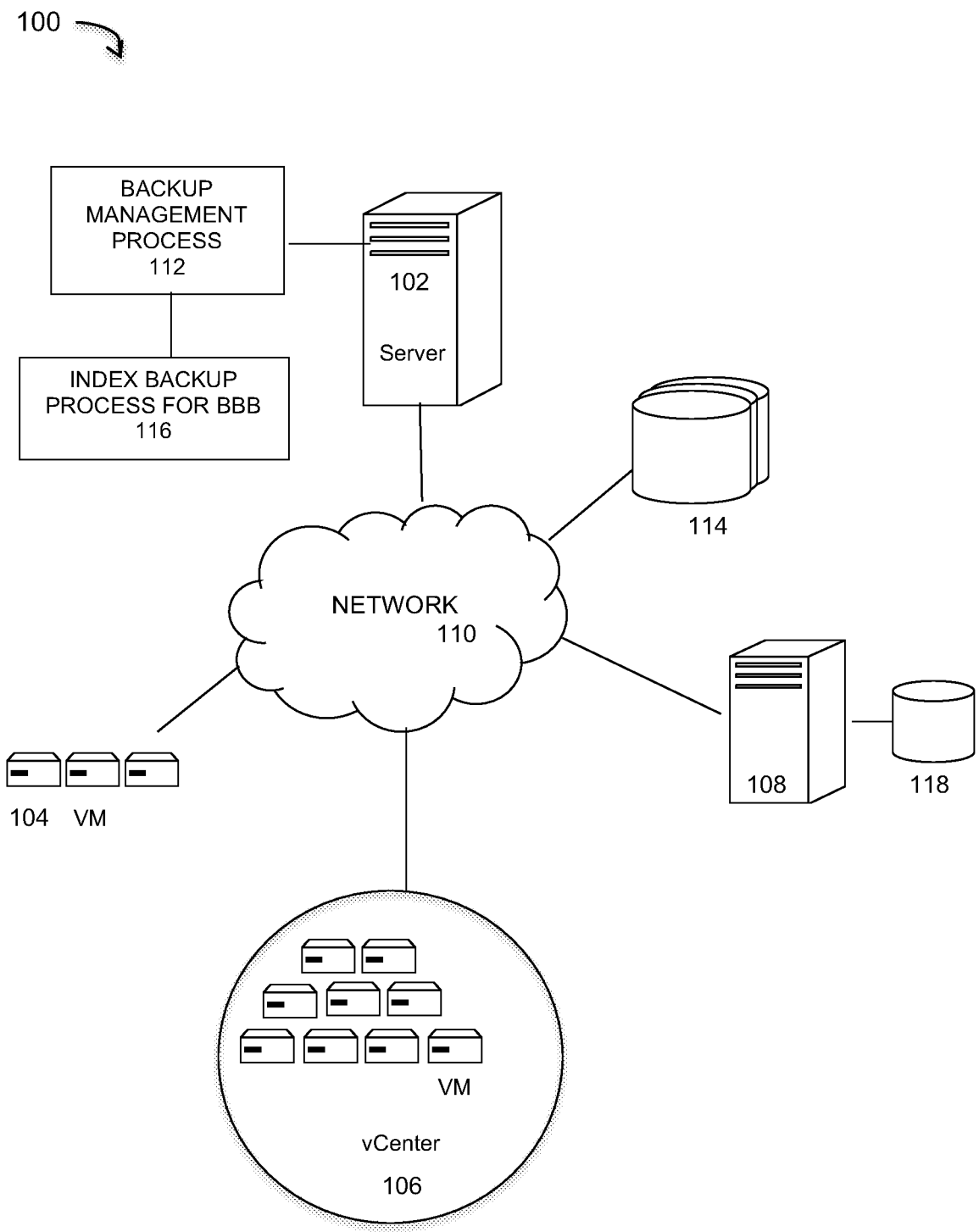
FIG. 1 is a diagram of a large-scale network implementing a block based backup system that performs file index backups, under some embodiments.

A detailed description of one or more embodiments is provided below along with accompanying figures that illustrate the principles of the described embodiments. While aspects of the invention are described in conjunction with such embodiment(s), it should be understood that it is not limited to any one embodiment. On the contrary, the scope is limited only by the claims and the invention encompasses numerous alternatives, modifications, and equivalents. For the purpose of example, numerous specific details are set forth in the following description in order to provide a thorough understanding of the described embodiments, which may be practiced according to the claims without some or all of these specific details. For the purpose of clarity, technical material that is known in the technical fields related to the embodiments has not been described in detail so that the described embodiments are not unnecessarily obscured.

It should be appreciated that the described embodiments can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any physical medium that can contain or store the program for use by or in connection with the instruction execution system, apparatus or device. For example, the computer-readable storage medium or computer-usable medium may be, but is not limited to, a random-access memory (RAM), read-only memory (ROM), or a persistent store, such as a mass storage device, hard drives, CDROM, DVDROM, tape, erasable programmable read-only memory (EPROM or flash memory), or any magnetic, electromagnetic, optical, or electrical means or system, apparatus or device for storing information. Alternatively, or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory. Applications, software programs or computer-readable instructions may be referred to as components or modules. Applications may be hardwired or hard coded in hardware or take the form of software executing on a general-purpose computer or be hardwired or hard coded in hardware such that when the software is loaded into and/or executed by the computer, the computer becomes an apparatus for practicing the invention. Applications may also be downloaded, in whole or in part, through the use of a software development kit or toolkit that enables the creation and implementation of the described embodiments. In this specification, these implementations, or any other form that the invention may take, may be referred to as techniques. In general, the order of the steps of disclosed processes may be altered within the scope of the invention.

Some embodiments of the invention involve automated backup techniques in a distributed system, such as a very large-scale wide area network (WAN), metropolitan area network (MAN), or cloud based network system, however, those skilled in the art will appreciate that embodiments are not limited thereto, and may include smaller-scale networks, such as LANs (local area networks). Thus, aspects of the one or more embodiments described herein may be implemented on one or more computers executing software instructions, and the computers may be networked in a client-server arrangement or similar distributed computer network.

FIG. 1 illustrates a computer network system 100 that implements one or more embodiments of a reverse-mapping process for a method and system for backing up indexes along with changed blocks as part of incremental backups in a large-scale computer network including virtual machines (VMs). In system 100, a number of VMs or groups of VMs 104 are provided to serve as backup targets. Target VMs may also be organized into one or more vCenters (virtual centers) 106 representing a physical or virtual network of many virtual machines (VMs), such as on the order of thousands of VMs each. The VMs serve as target storage devices for data backed up from one or more data sources, such as computer 108, which may have attached local storage 118 or utilize networked accessed storage devices 114. The data sourced by the data source may be any appropriate data, such as database data that is part of a database management system. In this case, the data may reside on one or more hard drives (118 and/or 114) and may be stored in the database in a variety of formats. One example is an Extensible Markup Language (XML) database, which is a data persistence software system that allows data to be stored in XML format. Another example is a relational database management system (RDMS) which uses tables to store the information. Computer 108 may represent a database server that instantiates a program that interacts with the database. Each instance of a database server may, among other features, independently query the database and store information in the database, or it may be an application server that provides user interfaces to database servers, such as through web-based interface applications or through virtual database server or a virtual directory server applications.

A network server computer 102 is coupled directly or indirectly to the target VMs 104 and 106, and to the data source 108 through network 110, which may be a cloud network, LAN, WAN or other appropriate network. Network 110 provides connectivity to the various systems, components, and resources of system 100, and may be implemented using protocols such as Transmission Control Protocol (TCP) and/or Internet Protocol (IP), well known in the relevant arts. In a distributed network environment, network 110 may represent a cloud-based network environment in which applications, servers and data are maintained and provided through a centralized cloud-computing platform. In an embodiment, system 100 may represent a multi-tenant network in which a server computer runs a single instance of a program serving multiple clients (tenants) in which the program is designed to virtually partition its data so that each client works with its own customized virtual application, with each VM representing virtual clients that may be supported by one or more servers within each VM, or other type of centralized network server.

The data generated or sourced by system 100 may be stored in any number of persistent storage locations and devices, such as local client storage, server storage (e.g., 118), or network storage (e.g., 114), which may at least be partially implemented through storage device arrays, such as RAID components. In an embodiment network 100 may be implemented to provide support for various storage architectures such as storage area network (SAN), Network-attached Storage (NAS), or Direct-attached Storage (DAS) that make use of large-scale network accessible storage devices 114, such as large capacity disk (optical or magnetic) arrays. In an embodiment, the target storage devices, such as disk array 114 may represent any practical storage device or set of devices, such as fiber-channel (FC) storage area network devices, and OST (OpenStorage) devices. In a preferred embodiment, the data source storage is provided through VM or physical storage devices, and the target storage devices represent disk-based targets implemented through virtual machine technology.

For the embodiment of FIG. 1, network system 100 includes a server 102 that executes a data backup process that performs block based backups through a CBT component. The backup management process 112 automates the backup of network data using the target VM devices. In an embodiment, the process 112 uses certain known full and incremental (or differencing) backup techniques along with a snapshot backup process that is used to store an image or images of the system(s) to be backed up prior to the full or incremental backup operations. System 100 also includes a process or system component 116 that backs up indexes along with the changed blocks in a manner that eliminates the remounting of volumes or file systems to perform data searches and other data access or processing operations.

In an embodiment, system 100 may represent a Data Domain Restorer (DDR)-based deduplication storage system, and storage server 102 may be implemented as a DDR Deduplication Storage server provided by EMC Corporation. In this case, the backup runs in the Networker client and after embedding changed blocks in VHDx format it sends the data to Networker storage node (Data domain). It should be noted, however, that other similar backup and storage systems are also possible. System 100 may utilize certain protocol-specific namespaces that are the external interface to applications and include NTFS (Windows file system), NTS (network file system) and CIFS (common internet file system) namespaces, among others.

In general, the systems and methods described herein operate with Windows-based operating system (OS) networks. Alternatively, embodiments may be used or adapted to be used with other OS systems, including virtual machine environments using hypervisors (e.g., Hyper-V) to create and run the virtual machines. These may include the Hyper-V hypervisor, which is a native hypervisor that creates VMs on Intel x86-64 based systems and is part of the Microsoft Windows server products. Thus, the block based backup feature works even with VMs created using any virtualization technology, including VMs created using VMware, as well as on the physical machines themselves.

In an embodiment, system 100 represents a backup platform (e.g., EMC Networker) that supports block-based backups (BBB) of volumes and files in a virtual hard disk (VHD or VHDx) format. For this embodiment, the files to be backed up are virtual hard disk files that may be formatted as a VHD (Microsoft Virtual Hard Disk Image) or Microsoft VHDx file. The VHDx format is a container format, which can contain disk related information. VHDx files can be mounted and used as a regular disk. Volumes such as NTFS/ReFS/FAT32 or any file system which the OS supports on the mounted disk can also be created.

The backup methods described herein may be used to implement system backup sessions for full, incremental or differential backups or any combination of full and incremental or differential backups. A full backup backs up all files from a data source in a specified backup set or job, while an incremental backup backs up only changed and new files since the last backup. Incremental backup procedures may use a changed block tracking (CBT) feature that may be provided by the backup system, such as NetWorker. As such, it may be provided as a device driver sitting in the storage stack that monitors all the "block writes" on the volume.

As shown in FIG. 1, embodiments of the backup management process 112 include processes and/or components 116 to backup indexes along with changed data blocks as part of incremental backup operations to identify changed files in incremental block based backups to backup indexes. For full backups (Level FULL), index backups can be easily achieved since these perform complete filesystem traversal. For incremental backups, however, process 116 introduces a new method that completely bypasses file system traversal and parses only changed blocks to obtain complete file paths for data. The process uses the fact that each file has an associated MFT (master file table) record in NTFS filesystem. Each MFT record has a filename entry and parent MFT record number and with these two fields the process 116 can construct the complete file path by traversing from the changed MFT record up till the root directory. This is an extension to the above-mentioned previous solutions and does not require the source machine to be mounted on proxy. This allows the process to be extended to virtual machine protection as well, and a Linux proxy can backup windows client in VMware environments and also can be used to backup indexes in a BBB framework, among other advantages.

On a typical NTFS volume, all file information like file name, creation date, access permissions, and optional contents etc. are stored as metadata in the Master File Table (MFT). In general, the MFT is used in an NTFS file system to store at least one entry for every file on an NTFS file system volume, including the MFT itself. All information about a file, including its size, time and date stamps, permissions, and data content, is stored either in MFT entries, or in space outside the MFT that is described by MFT entries. As files are added to an NTFS file system volume, more entries are added to the MFT and the MFT increases in size. When files are deleted from an NTFS file system volume, their MFT entries are marked as free and may be reused. However, disk space that has been allocated for these entries is not reallocated, and the size of the MFT does not decrease. The NTFS file system reserves space for the MFT to keep the MFT as contiguous as possible as it grows. The space reserved by the NTFS file system for the MFT in each volume is called the MFT zone. Space for file and directories are also allocated from this space, but only after all of the volume space outside of the MFT zone has been allocated.

Each file/directory in the file system is represented by a unique MFT record in the MFT. On a typical NTFS volume, sectors can be segregated into three sets; MFT zone sectors, files actual data blocks and index records. Index records store directory structure in the form of B-trees. Embodiments of process 112 use the MFT zone sectors. Since the MFT tracks file system metadata, it follows that any change to a file/directory on the file system translates to a corresponding change in the MFT record for the file within the MFT zone.

As stated above, for an NTFS (and other similar file systems), each file has an associated Master File Table (MFT) record. Each MFT record has a filename entry and parent MFT record number and with these two fields, the system can construct the complete file path by traversing from the changed MFT record up till the root directory. This mechanism thus eliminates the requirement that the source machine be mounted on a proxy. All the files/folders in NTFS are represented as an MFT record. The MFT zone is a non-contiguous array of MFT records. This MFT zone location is stored in the NTFS boot information. MFT record 0 describes the MFT zone and its location. As part of an incremental backup, the system gets changed blocks from the driver. These blocks include MFT records, index records (i.e., directories if any) and actual data portions. In an embodiment, process 116 intersects the extents of MFT record 0 (i.e., MFT zone) with changed blocks, which effectively results in blocks pertaining to MFT records only. It then parses all these records to construct the complete file path that are modified.

Given a set of changed blocks on a NTFS volume, embodiments of process 116 provide a reverse mapping solution to map each changed sector/block to the file to which it belongs. From the set of changed sectors on the volume, the process extracts the sectors in use by NTFS. From these, it filters out the sectors belonging to the MFT zone.

Figure 2:
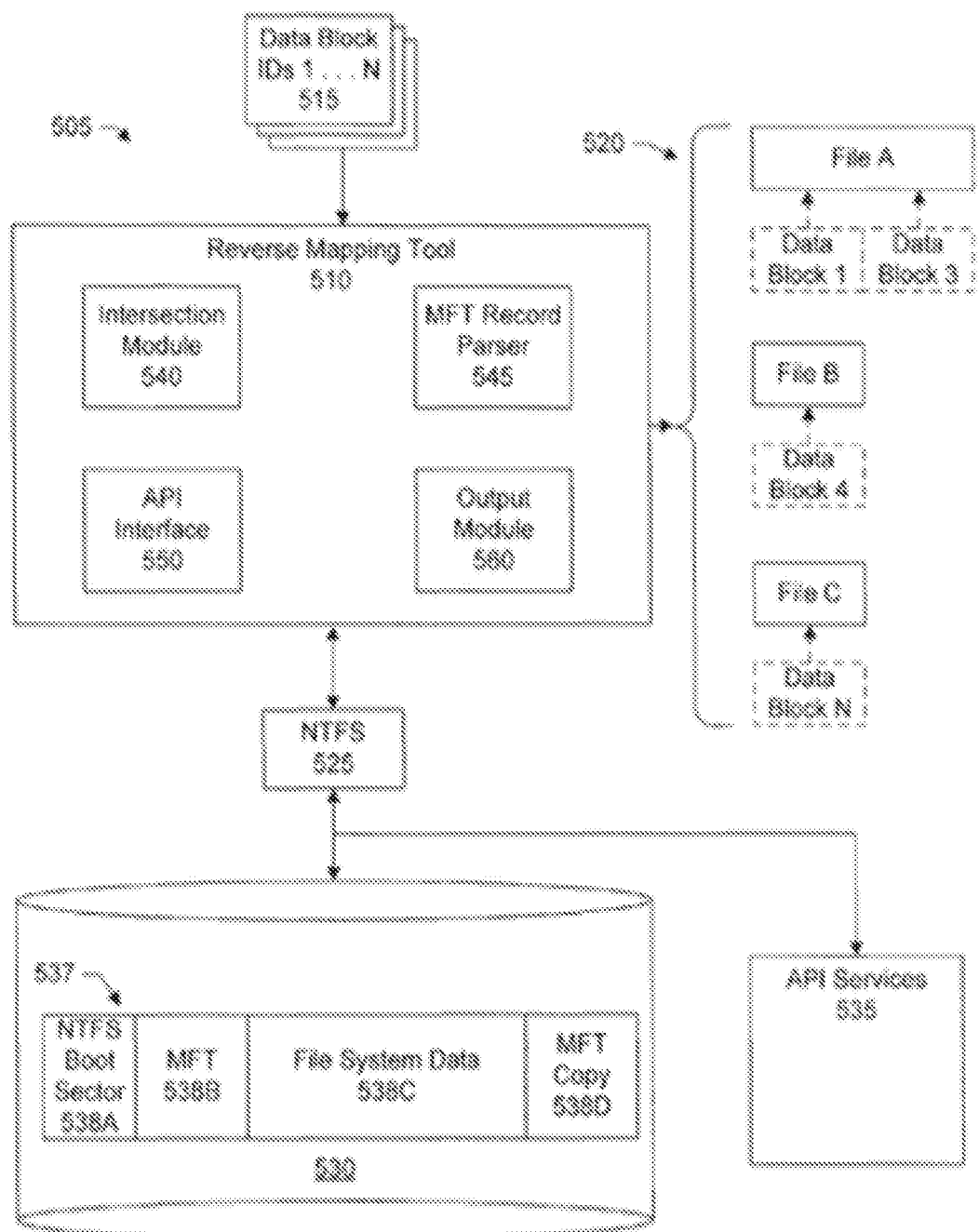
FIG. 2 is a block diagram of a file system environment that implements a reverse mapping process under some embodiments.

For block-based backup systems, the reverse mapping techniques as described herein can identify the data objects (e.g., files, directories, or both) whose blocks have been backed up. FIG. 2 is a block diagram of a file system environment that implements a reverse mapping process under some embodiments. Tool 510 represents a processing module that is part of process 116 of FIG. 1, under an embodiment. As shown in FIG. 2, there is a reverse mapping tool 510, an input 515 to the tool, an output 520 by the tool, a file system 525, a storage 530, and application programming interface (API) services 535 that may be provided by the file system or an operating system of the file system. The reverse mapping tool may include an intersection module 540, a file table record parser 545, an API interface 550, and an output module 560.

Figure 3:
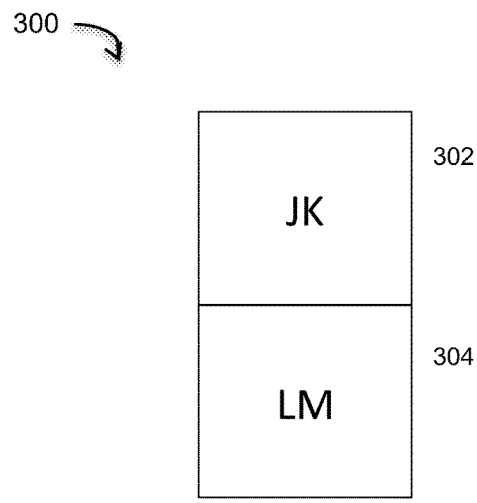
FIG. 3 illustrates an example of a file and associated data blocks under an embodiment.

In a specific implementation, the tool receives as input one or more data block identifiers 515 (e.g., identifiers 1 . . . N). In this specific implementation, the identifiers do not include actual data content of a block and instead include an indication, identification, or specification of the blocks on the storage device or volume where the actual data content is located. This helps to conserve system resources because the actual data in the block is not being received. The tool can map or reverse map the data blocks to the files that they belong to. FIG. 3 illustrates an example of a file and associated data blocks. For the example of FIG. 3, a file 300, or other data object, can include one or more blocks of data such as blocks 302 and 304 having content JK and LM, respectively. Generally, a file is stored on media (e.g., hard disk) in one or more blocks. In other words, a file or a file's contents may be divided into one or more blocks of content. Typically, a block is of a predetermined uniform size such as 1 kilobyte, 4 kilobytes, and so forth. The size can range from about 512 bytes to about 64 kilobytes, but the range and size of a block can vary depending on, for example, the particular file system and size of the storage media. A block may be referred to as a sector, cluster, disk space unit, or allocation unit.

Referring to FIG. 2, in a specific implementation, the tool 510 outputs 520 a list including one or more files or file paths that the received blocks (or a subset of the received blocks) have been mapped to. For example, the tool may map received data blocks 1 and 3 to file A and output a list including file A. The tool may map received data block 4 to file B and the outputted list may include file B, and so forth. The output may be provided programmatically such as in response to an API request so that further processing can occur, provided to an electronic display or printer, provided in an e-mail, e-mail attachment, or other notification, or combinations of these. The output may be in any suitable format such as XML, HTML, text file, ASCII, and so forth.

The tool 510 may be adapted for use with the file system or file system format referred to as the New Technology File System (NTFS) provided by Microsoft. In other embodiments, the tool may be implemented for use with other file systems such as the Unix File System (UFS), VMware Virtual Machine File System (VMFS), Hierarchical File System (HFS), Hierarchical File System Plus (HFS Plus), File Allocation Table (FAT), Oracle Automatic Storage Management Cluster File System (Oracle ACFS), Journaled File System (JFS), second extended file system (Ext2), third extended file system (Ext3), fourth extended file system (Ext4), and many others. It should be noted that although the logic of the tool is described with respect to NTFS systems, embodiments can also be applied or be extended for use with other file systems. Such embodiments would be adapted to the possibly different layout of these other file systems.

In general, an NTFS file system includes a layout 537 on the disk including an NTFS boot sector 538A, a file table 538B, a file system data or a data region 538C for storing file content, and a file table copy 538D. The boot sector includes information regarding the layout of the file system (offset to the file table), and details related to booting from the file system. In NTFS, the file table is referred to as the Master File Table (MFT). The MFT is organized to include file information via a set of MFT records. The MFT is itself treated like a file in NTFS. Each MFT record and as an extension each file includes information regarding the file such as timestamps, 48-bit MFT record number, and 16-bit update sequence number. The combination or concatenation of the MFT record number and update sequence number yield a 64-bit number referred to as the File Reference Number (FRN). In other words, on a typical NTFS volume, file information such as file name, creation date, access permissions, contents and so forth, are stored as metadata in the Master File Table (MFT). Each file, directory, or both in the file system is represented by a unique MFT record in the MFT. Also, each file, directory, or both in the file system can be referred by means of a File Reference Number (FRN). On a typical NTFS volume, sectors can be segregated into three sets: MFT zone sectors, files or actual data, and index records.

When a file, directory, or both is created on an NTFS volume, a record is created for the file or directory. The record is used to store information about the file or directory. There is at least one entry in the MFT for every file on an NTFS file system volume, including the MFT itself. Information about a file, including its size, time and date stamps, permissions, and data content, is stored either in MFT entries, or in space outside the MFT that is described by MFT entries. As files are added to an NTFS file system volume, more entries are added to the MFT and the MFT increases in size. When files are deleted from an NTFS file system volume, their MFT entries are marked as free and may be reused. However, disk space that has been allocated for these entries is not reallocated, and the size of the MFT does not decrease. The NTFS file system reserves space for the MFT to keep the MFT as contiguous as possible as it grows. The space reserved by the NTFS file system for the MFT in each volume is called the MFT zone. Since the MFT tracks file system metadata, it follows that any change to a file, directory, or both on the file system translates to a corresponding change in the MFT record for the file or directory within the MFT zone. The tool can examine the MFT zone sectors for these changes.

In a specific implementation, upon receipt of the data block identifiers by the tool, intersection module 540 intersects the received data block identifiers with the MFT zone blocks to make, create, produce, or generate an intersect. The intersect includes the MFT records corresponding to the data block identifiers. That is, the intersect may include a subset of the MFT records rather than all the MFT records. MFT record parser 545 is responsible for parsing each record in the subset of MFT records to select the desired MFT records. From the selected MFT records of the subset, the tool obtains the FRNs. Using the FRN, the tool can send a request through API interface 550 to API services 535 to obtain file name information. The technique allows parsing of a subset of the MFT records or at most a subset of records rather than all of the MFT records. That is, the changed files, directories, or both between back-ups or between incremental backups can be identified without having to parse each record of the MFT.

In a specific implementation, the data block identifiers specify changed blocks (or sectors) on the volume. A changed block may refer to a block whose data content has changed since the last backup. Given a set of changed blocks on an NTFS volume, the tool reverse maps each changed sector or block to the file that it belongs to. From the set of changed sectors on the volume, the tool extracts the sectors in use by NTFS. From these, the tool filters out the sectors belonging to the data section of the MFT itself. At this point in time, there is a list of MFT records (one MFT record=at least 2 NTFS sectors). Each MFT record is further processed to extract an MFT record sequence number (16 bits) and an MFT record number (48 bits). The FRN of the file corresponding to this record is a concatenation of the sequence number and the record number, i.e., a 64-bit FRN=16-bit sequence number+48-bit MFT record number. From the list of FRNs the tool opens the file in question by using its FRN via the NtCreateFile API using the FILE_OPEN_BY_FILE_ID option. Once a handle to the file is obtained, the tool uses the GetFileInformationByHandle API to obtain the file information. In other words, any change to a file changes the MFT record for the file itself due to changes to timestamps, and so forth. In a specific implementation, the tool examines the changed blocks and segregates blocks into the categories MFT records and other data (superset of the actual file blocks) by using MFT record zero (the first record in Master File Table). This record includes information about Master File Table location information. From each changed MFT record the tool extracts the file reference number (FRN). The tool uses the API NtCreateFile (FILEOPEN_BY_FILE JD option) to open a handle to the file using the FRN instead of the path. Upon obtaining the handle, the tool uses the GetFileInformationByHandle API to obtain the file name.

Figure 4:
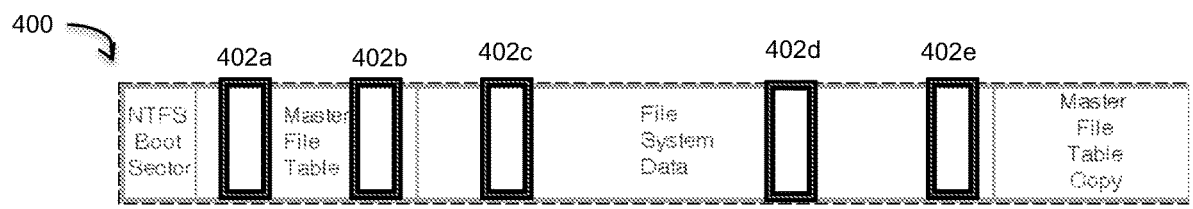
FIG. 4 illustrates example changes blocks that are part of a Master File Table under some embodiments.

FIG. 4 illustrates example changes blocks that are part of a Master File Table by using MFT record zero under some embodiments. As shown in the example of FIG. 4, the MFT 400 comprises a number of different fields such as the NTFS boot sector, file system data, and master file table copy. The boxes 402*a*-*e* are changed blocks. At this point in time there is a list of MFT records, where one MFT record equals a minimum of two NTFS sectors. Each MFT record is further processed to extract file name for the MFT record and its parent MFT record number. Given the filename and its parent MFT record, the process recursively traverses back until it reaches the root MFT record number. It keeps appending all the filename during this travel process. In an embodiment, a hash table is used to speed the process for all top-level directories. FIG. 4 is intended to be an example of an MFT instance for purposes of illustration and embodiments are not so limited. Other table formats and example block assignments are also possible.

The example layout of FIG. 4 shows an example of an NTFS layout 400 where areas 402*a*-402*e* represent changed blocks. In a specific implementation, in a first step, the tool 510 finds what changed blocks are part of Master File Table (by using MFT record zero). Thus, in the example shown in FIG. 4, blocks 402*a* and 402*b* are part of the MFT. The tool can ignore the rest of the blocks. The tool can parse the relevant MFT records which are part of Master File Table and obtain FRN for each relevant MFT record. Then by using Windows provided APIs the tool can get the full file path.

Figure 5:
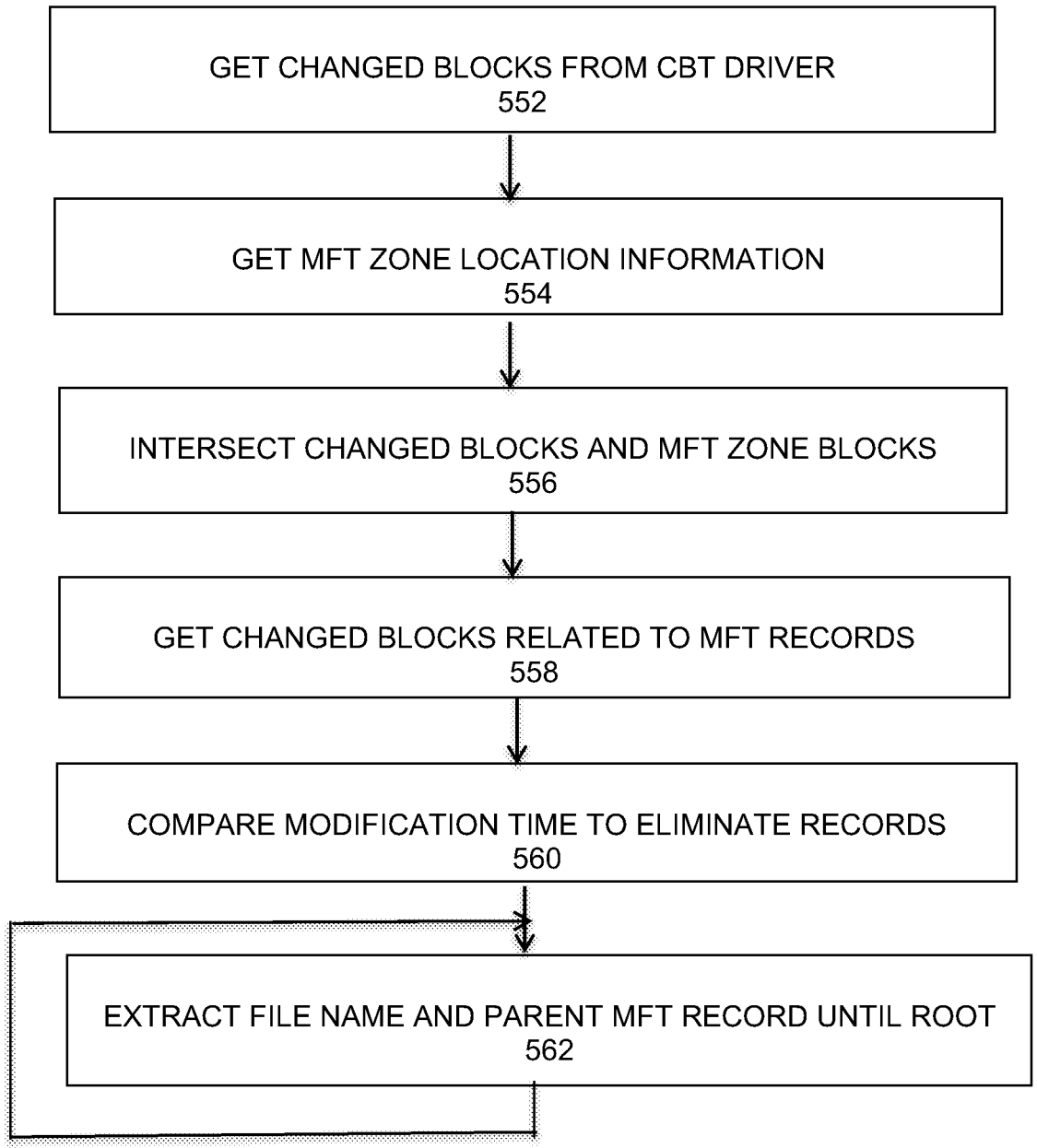
FIG. 5 is a flowchart that illustrates a method of identifying changed files in incremental block based backups under some embodiments.

FIG. 5 is a flowchart that illustrates a method of identifying changed files in incremental block based backups under some embodiments. As shown in FIG. 5, the process starts by getting the changed blocks from CBT driver, step 552. It then parses the NTFS boot record to get the MFT zone location information, step 554. Next, in step 556, it intersects the MFT zone blocks obtained from step 554 and changed blocks from step 552. In a specific implementation, the intersect includes a subset of file table records where each record in the subset is associated with a block from the file table zone that corresponds to a block identified by the received block identifiers. For example, if a file table record is associated with a block identified as "357" in the file table zone and the received block identifiers includes an identifier identifying block "357" then the record may be included in the subset of file table records. Conversely, if the received block identifiers do not include an identifier identifying block "357" then the record may be excluded or omitted from the subset. That is, a file table record that is associated with a block from the file table zone may be excluded or omitted from the subset if the block does not correspond to a block identified by the received block identifiers. The intersecting may include scanning or comparing the block location of the file table zone and the received block identifiers to find matching blocks.

This intersection step of the process obtains changed blocks related to MFT records, step 558, and eliminates other blocks like data blocks and index blocks. In step 560, for each MFT record of step 556, the process compares the modification time. This comparison is used to eliminate MFT records corresponding modified access time, which are also part of changed blocks. In step 560, if the comparison indicates the associated file was modified after the date, the tool derives file information for the associated file such as a file path to the associated file. The comparison allows the tool to confirm or verify that the associated file was indeed modified. For example, some operating systems will track or record a file's last access time including a last access time of operating system files. Data blocks associated with these accessed operating system files may be included with the received block identifiers even if the files have not been modified. Thus, the comparison may be performed in order to exclude or omit these files.

In step 562, the process parses each record and extract file name and its parent MFT record number. This parsing step is repeated for the parent MFT record until the root is reached. Each time it is performed, the process appends the file name to the previous MFT record's file name. Once the file name and full path are derived in step 562, the process 116 provides or transmits the file information (e.g., file path) to the backup engine to permit the backup engine to back up the file, directory, or both.

In an embodiment, standard operating system (OS) or file system path names are used. Paths can be built from an MFT record that may provide only a partial path. For example, in a case where the file "C:\windows\system32\config" is changed and should be backed up; the corresponding MFT record will have the file name attribute as "config" and not the full file path (e.g., "C:\windows\system32\config"). In an embodiment, step 562 builds the full file path. A path may include any value or combination of values to specify a particular file or directory in a file system. For example, a path may include a filename, directory name, subdirectory, drive letter, server name, device name, volume name, root directory, user directory, file extension, or combinations of these. A path may include one or more path components defined by a delimiting character such as a slash (e.g., "/"), backslash (e.g., "\"), colon (e.g., ":"), or other depending upon the operating system. For example, the path component "C:\" represents the drive letter "C:" or root directory.

The process 116 of FIG. 1 attempts to solve certain problems associated with present block based backup systems. First, traditional backup models backup data at an individual file level and rely on multiple mechanisms such as archive bit, time stamps, journaling, and so on, to determine the file to be backed up during an incremental backup, i.e., the changed files since the last backup. The common issue with most of the methods used is that it requires the backup software to walk through the entire file system tree structure to find the files. Even though this can be mitigated by using the NTFS journal to find the files modified, this approach is also encumbered by problems like performance overhead of enabling the journal, the fact that the journal has to be enabled (some users may not like the additional overhead) and the issue of allocating adequate space for the journal and journal overflow. In addition, if is some knowledge of the changed file system blocks, this knowledge is of no use to such backup models. Second, block based backup models bypass the file system entirely and backup only the changed blocks of a file system. However, the disadvantage with this approach is that to provide lookup of file indexes out of block based backups, it is necessary to mount the backup images. Thus, if the user wants to search for a file/folder in a set of data savesets, it is time consuming to mount all the savesets and perform the search.

Process 116 of FIG. 1 effectively solves both these problems by, in the case of file based backup model, the generating a list of changed files which can be fed into the backup engine eliminating the need to find the changed files using earlier methods, thereby potentially speeding up the process. Second, in the case of block based backup model, complementing the backup strategy by indexing just the changed files between backups instead of all the files. The approach makes use of mechanisms built into the file system itself, i.e., the MFT structure, instead of using external means of tracking changes to the files like journaling, thereby eliminating overhead. It avoids use of mounting or using Win32 APIs to get file paths which is needed in the certain previous solutions. It identifies the complete file path from collected modified metadata blocks during backup, which significantly saves time in identifying files for indexing in incremental backups.

Implementation Example

Embodiments of process 116 act on records that may be stored in the MFT, and a record may be referred to as an entry. The record describes the associated file (or directory). The record may include a set of attributes including a standard information attribute, a file name attribute, a security descriptor attribute, and a data attribute. The standard information attribute may include information such as read/write permissions of the associated file, creation time of the associated file, last modification time of the associated file, a count or number of how many directories point to the associated file (e.g., a hard link count). The file name attribute describes the file name in the Unicode character set. There can be multiple file names such as when the file has multiple links or the file has an MS-DOS short name. The security descriptor attribute lists which user owns the associated file, which users can access the associated file, and how the users can access the associated file.

Depending on the size of the associated file, the data attribute can include the actual file data such as in the case of a small file or small file size. Alternatively, if the file size is large, the data attribute can include pointers or an index to the actual file data (or pointers to the objects that point to the actual file data). The pointers to the data may include pointers to sequences of logical clusters or blocks on the disk. Each sequence may be identified by three parts including a starting cluster in the file referred to as the virtual cluster number (VCN), a starting logical cluster (LCN) of the sequence on the disk, and a length that is counted as a number of clusters. The run of clusters may be referred to as an extent. In other words, the data attribute of a record can be used to specify or identify the data blocks of the file that is associated with the record.

In this specific implementation, an initial record of the MFT (e.g., MFT record or entry 0) is parsed to identify the block location of the MFT zone where the MFT is stored. For example, parsing the initial record can identify a starting and ending block of the MFT zone. In a specific implementation, the starting and ending blocks of the MFT zone are converted into an extent that may be referred to as the block location of the MFT zone. It should be appreciated, however, that the block location of the MFT zone can be any value or set of values that can identify the blocks reserved or allocated to the MFT zone.

In an embodiment, system 100 represents a Microsoft Windows based system using NTFS as the file system, though embodiments are not so limited. In general, everything is a file in NTFS. The index to these files is the Master File Table (MFT). The MFT lists the Boot Sector file ($Boot), located at the beginning of the disk. $Boot also lists where to find the MFT. The MFT also lists itself.

Located in the center of the disk are certain metadata files. Of specific interest are SMFTMirr and $LogFile. The MFT Mirror is an exact copy of the first four records of the MFT. If the MFT is damaged, and then the volume could be recovered by finding the mirror. The LogFile is journal of all the events waiting to be written to disk. If the machine crashes, then the LogFile is used to return the disk to a sensible state. Hidden at the end of the volume is a copy of the boot sector (cluster 0). The only metadata file that makes reference to it is $Bitmap, and that only says that the cluster is in use.

With respect to the MFT zone, the NTFS file system reserves space for the MFT to keep the MFT as contiguous as possible as it grows. The space reserved by the NTFS file system for the MFT in each volume is called the MFT zone. Space for file and directories are also allocated from this space, but only after all of the volume space outside of the MET zone has been allocated. Depending on the average file size and other variables, either the reserved MFT zone or the unreserved space on the disk may be allocated first as the disk fills to capacity. Volumes with a small number of relatively large files will allocate the unreserved space first, while volumes with a large number of relatively small files allocate the MFT zone first. In either case, fragmentation of the MFT starts to take place when one region or the other becomes fully allocated. If the unreserved space is completely allocated, space for user files and directories will be allocated from the MFT zone. If the MET zone is completely allocated space for new MFT entries will be allocated from the unreserved space.

Metafiles are an important concept when it comes to learning the way in which NTFS was designed. As said above, everything in NTFS is a file. This means that information such as the cluster location of a file (the FAT in FAT32 partitions), the Volume Name, the Boot Sector and even Directories have to be seen as files. Because it is not convenient for the user (and quite dangerous) to show files like "CAbootsector.bin", NTFS uses the concept of Metafiles. These are totally hidden system files (not hidden by a simple "hidden" attribute, but hidden by the NTFS Driver itself) that contain the core information about an NTFS partition. By reading them, one is able to decode the entire on-disk structure of any NTFS partition.

Below are some example Metafile data elements that may be used in certain example embodiments:
0 $MFT Master File Table
1 $MFTMirr A backup copy of the first 4 records of the MFT
2 $LogFile Log File for CHKDSK
3 $Volume Volume Name, Serial Number etc. . . .
4 $AttrDef Definitions of every Attribute
5 . (dot) Root directory of the disk
6 $Bitmap Map of used and unused clusters
7 $Boot Boot record of the volume
8 $BadClus List of bad clusters on the partition
9 $Secure Security Descriptors for each file
10 $UpCase Table of uppercase characters used for conversion
11 $Extend Directory for the last four Metafiles.
12-23 UNUSED Marked in use, or not in use, but empty.
Any $ObjId Unique Object IDs given to every file
Any $Quota Disk space usage quota information
Any $Reparse Reparse point information
Any $UsnJrnl NTFS USN Journal (for encryption)

Each MFT FILE Record is built up from Attributes. Below are some example Attribute data elements that may be used in certain example embodiments:
Type Name IRN Min Size Max Size
&H10 $STANDARD_INFORMATION
&H20 $ATTRIBUTE_LIST
&H30 $FILE_NAME
&H40 $OBJECT_ID
&H50 $SECURITY_DESCRIPTOR
&H60 $VOLUME_NAME
&H70 $VOLUME_INFORMATION
&H80 $DATA
&H90 $INDEX_ROOT
&HA0 $INDEX_ALLOCATION
&HB0 $BITMAP
&HC0 $REPARSE_POINT
&HD0 $EA_INFORMATION
&HE0 $EA—
&HF0 $PROPERTY_SET
&H100 $LOGGED_UTILITY_STREAM As mentioned above each MFT record contains $FILE_NAME. The job of the $FILE_NAME Attribute is quite simple. It is where the name of file contained in the File Record is held (or the name of the Directory). This Attribute is also present for each Hard Link (folders actually pointing to other folders or volumes), one for each copy, with the appropriate other information contained.
Public Type FILENAME_ATTRIBUTE
ParentDirFileRefNumber As LARGE_INTEGER
CreationTime As LARGE_INTEGER
ChangeTime As LARGE_INTEGER
LastWriteTime As LARGE_INTEGER
LastAccessTime As LARGE_INTEGER
AllocatedSize As LARGE_INTEGER
RealSize As LARGE_INTEGER
FileAttributes As NtfsFileAttributes
EABufferOrReparseType As Long
NameLength As Byte
NameSpace As NtfsFileNameSpaces
FileName( ) As Byte
End Type Although some specific flows are presented in flowchart or flow diagram form, it should be understood that the process is not limited to the specific flows and steps presented. For example, a flow may have additional steps (not necessarily described in this application), different steps which replace some of the steps presented, fewer steps or a subset of the steps presented, or steps in a different order than presented, or any combination of these. Further, the steps in other implementations may not be exactly the same as the steps presented and may be modified or altered as appropriate for a particular process, application or based on the data.

Although embodiments are described with respect to the NTFS file system and the NTFS MFT data structure, embodiments are not so limited. Any other appropriate file system and accompanying master file table structure can be used and adapted for use with the index backup process 116, under alternative embodiments. Likewise, although embodiments have been described with respect to network backup comprising certain specific technologies, such as Hyper-V server it should be noted that embodiments are not so limited, and that other backup systems and methods may also utilize the block based backup and reverse mapping methods described herein.

Figure 6:
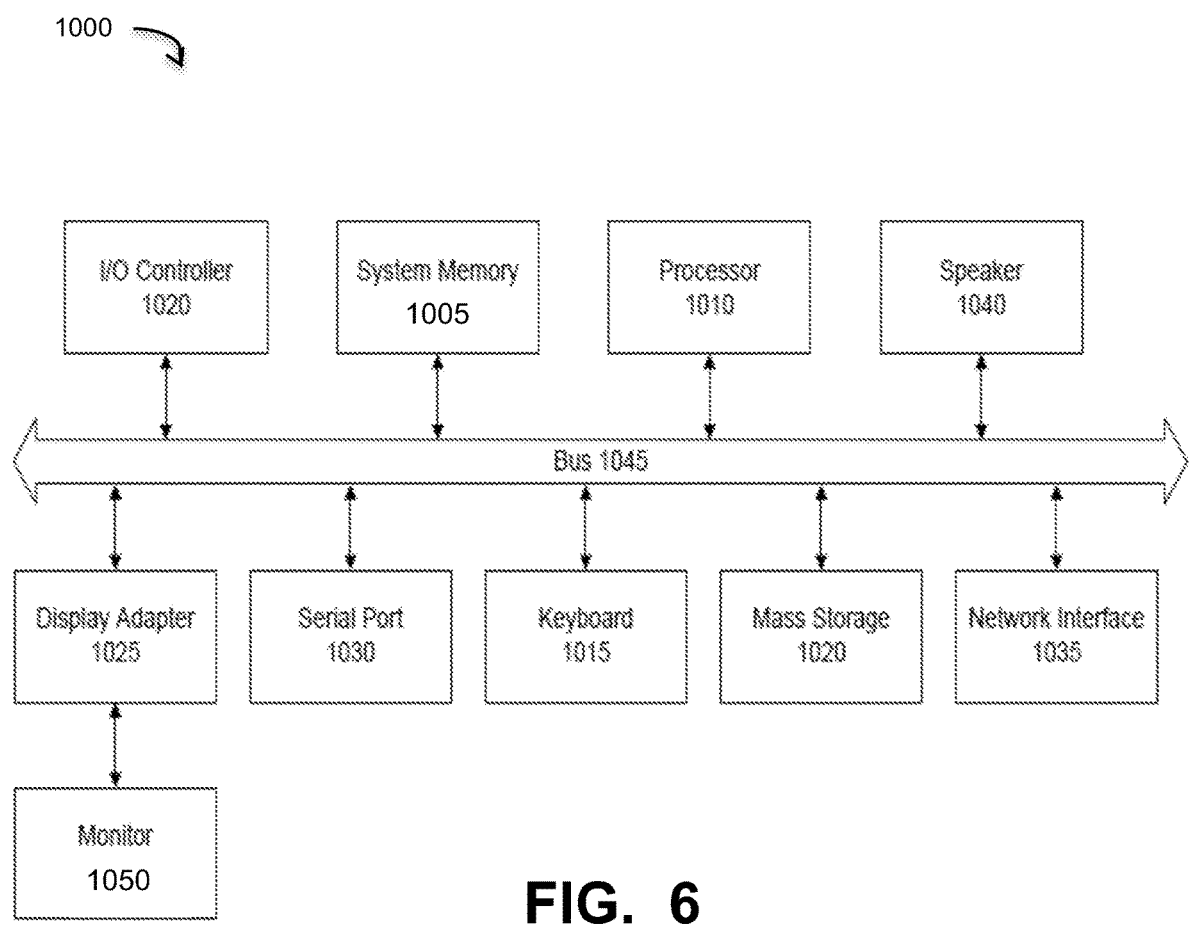
FIG. 6 shows a system block diagram of a computer system used to execute one or more software components of the present system described herein.

The network environment of FIG. 1 may comprise any number of individual client-server networks coupled over the Internet or similar large-scale network or portion thereof. Each node in the network(s) comprises a computing device capable of executing software code to perform the processing steps described herein. FIG. 6 shows a system block diagram of a computer system used to execute one or more software components of the present system described herein. The computer system 1000 includes a monitor 1050, keyboard 1015, and mass storage devices 1020. Computer system 1000 further includes subsystems such as central processor 1010, system memory 1005, input/output (I/O) controller 1020, display adapter 1025, serial or universal serial bus (USB) port 1030, network interface 1035, and speaker 1040. The system may also be used with computer systems with additional or fewer subsystems. For example, a computer system could include more than one processor 1010 (i.e., a multiprocessor system) or a system may include a cache memory.

Arrows such as 1045 represent the system bus architecture of computer system 1000. However, these arrows are illustrative of any interconnection scheme serving to link the subsystems. For example, speaker 1040 could be connected to the other subsystems through a port or have an internal direct connection to central processor 1010. The processor may include multiple processors or a multicore processor, which may permit parallel processing of information. Computer system 1000 shown in FIG. 8 is but an example of a computer system suitable for use with the present system. Other configurations of subsystems suitable for use with the present invention will be readily apparent to one of ordinary skill in the art.

Computer software products may be written in any of various suitable programming languages. The computer software product may be an independent application with data input and data display modules. Alternatively, the computer software products may be classes that may be instantiated as distributed objects. The computer software products may also be component software. An operating system for the system may be one of the Microsoft Windows®. family of systems (e.g., Windows Server), Linux, Mac OS X, IRIX32, or IRIX64. Other operating systems may be used. Microsoft Windows is a trademark of Microsoft Corporation.

Furthermore, the computer may be connected to a network and may interface to other computers using this network. The network may be an intranet, internet, or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, 802.11ac, and 802.11ad, just to name a few examples), near field communication (NFC), radio-frequency identification (RFID), mobile or cellular wireless. For example, signals from a computer may be transferred, at least in part, wirelessly to components or other computers.

In an embodiment, with a web browser executing on a computer workstation system, a user accesses a system on the World Wide Web (WWW) through a network such as the Internet. The web browser is used to download web pages or other content in various formats including HTML, XML, text, PDF, and postscript, and may be used to upload information to other parts of the system. The web browser may use uniform resource identifiers (URLs) to identify resources on the web and hypertext transfer protocol (HTTP) in transferring files on the web.

In other implementations, the user accesses the system through either or both of native and nonnative applications. Native applications are locally installed on the particular computing system and are specific to the operating system or one or more hardware devices of that computing system, or a combination of these. These applications can be updated (e.g., periodically) via a direct internet upgrade patching mechanism or through an applications store (e.g., Apple iTunes and App store, Google Play store, and Windows Phone App store).

The system can run in platform-independent, non-native applications. For example, client can access the system through a web application from one or more servers using a network connection with the server or servers and load the web application in a web browser. For example, a web application can be downloaded from an application server over the Internet by a web browser. Non-native applications can also be obtained from other sources, such as a disk.

For the sake of clarity, the processes and methods herein have been illustrated with a specific flow, but it should be understood that other sequences may be possible and that some may be performed in parallel, without departing from the spirit of the invention. Additionally, steps may be subdivided or combined. As disclosed herein, software written in accordance with the present invention may be stored in some form of computer-readable medium, such as memory or CD-ROM, or transmitted over a network, and executed by a processor. More than one computer may be used, such as by using multiple computers in a parallel or load-sharing arrangement or distributing tasks across multiple computers such that, as a whole, they perform the functions of the components identified herein; i.e. they take the place of a single computer. Various functions described above may be performed by a single process or groups of processes, on a single computer or distributed over several computers. Processes may invoke other processes to handle certain tasks. A single storage device may be used, or several may be used to take the place of a single storage device.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

All references cited herein are intended to be incorporated by reference. While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A computer-implemented method of identifying changed files in incremental block based backups, comprising:
    obtaining changed data blocks of a file from a change block tracking (CBT) driver, wherein the file has an associated master file table (MFT) record and a parent MFT record number used in a file system;
    constructing a complete file path of the file by traversing from the changed MFT record to the root directory using respective parent MFT record numbers by iteratively parsing each record by extracting the file name and parent MFT record number and appending the file name to a previous MFT record file name to create an appended file name;
    indexing only the changed data blocks of the complete file path using the extracted MFT file name and parent MFT record number to create a set of indexes for backup; and
    providing the appended file name and the indexes to a backup engine to backup data blocks comprising the file, wherein the backed up indexes eliminate a need to traverse and mount a data saveset including the file to allow a user to perform a specific search operation.

2. The method of claim 1 wherein the system comprises a Microsoft Windows based network, and wherein the file system is NTFS.

3. The method of claim 2 wherein the master file table (MFT) comprises records that represent corresponding files and folders in the NTFS system, and wherein an MFT zone location is stored in NTFS boot information.

4. The method of claim 3 further comprising:
parsing an NTFS boot record to obtain MFT zone location information for data blocks of the file; and
intersecting MFT zone blocks obtained in the parsing step with the changed data blocks.

5. The method of claim 4 wherein the intersecting step comprises scanning and comparing a block location of the file table zone and received block identifiers to find matching blocks.

6. The method of claim 5 further comprising comparing a modification time for the each record to eliminate MFT records with corresponding access times that are also part of changed blocks.

7. The method of claim 1 wherein the appended file name corresponds to a full file system path of the file as defined by the file system.

8. The method of claim 1 wherein the block based backups executed on client machines that are part of a data domain backup system.

9. A system comprising a processor-based executable module configured to identify changed files in incremental block based backups in a large-scale data storage system, comprising:
a reverse mapping component mapping each changed data block to a file to which the block belongs by obtaining changed data blocks of a file from a change block tracking (CBT) driver, wherein the file has an associated master file table (MFT) record and a parent MFT record number used in a file system; and
a recursive processing component constructing a complete file path of the file by traversing from the changed MFT record to the root directory using respective parent MFT record numbers by iteratively parsing each record by extracting the file name and parent MFT record number and appending the file name to a previous MFT record file name to create an appended file name, indexing only the changed data blocks of the complete file path using the extracted MFT file name and parent MFT record number to create a set of indexes for backup, and providing the appended file name and the indexes to a backup engine to backup data blocks comprising the file, wherein the backed up indexes eliminate a need to traverse and mount a data saveset including the file to allow a user to perform a specific search operation.

10. The system of claim 9 wherein the system comprises a Microsoft Windows based network, and wherein the file system is NTFS, and wherein the master file table (MFT) comprises records that represent corresponding files and folders in the NTFS system, and wherein an MFT zone location is stored in NTFS boot information.

11. The system of claim 10 further comprising:
a parser parsing an NTFS boot record to obtain MFT zone location information for data blocks of the file; and
an intersecting component intersecting MFT zone blocks obtained in the parsing step with the changed data blocks.

12. The system of claim 11 wherein the intersecting component scans and compares a block location of the file table zone and received block identifiers to find matching blocks.

13. The system of claim 12 further comprising a comparator comparing a modification time for the each record to eliminate MFT records with corresponding access times that are also part of changed blocks.

14. The system of claim 9 wherein the appended file name corresponds to a full file system path of the file as defined by the file system.

15. The system of claim 9 wherein the block based backups executed on client machines that are part of a data domain backup system.

16. A computer program product, comprising a non-transitory computer-readable medium having a computer-readable program code embodied therein, the computer-readable program code adapted to be executed by one or more processors to implement a method for identifying changed files in incremental block based backups, by:
obtaining changed data blocks of a file from a change block tracking (CBT) driver, wherein the file has an associated master file table (MFT) record and a parent MFT record number used in a file system; and
constructing a complete file path of the file by traversing from the changed MFT record to the root directory using respective parent MFT record numbers by iteratively parsing each record by extracting the file name and parent MFT record number and appending the file name to a previous MFT record file name to create an appended file name;
indexing only the changed data blocks of the complete file path using the extracted MFT file name and parent MFT record number to create a set of indexes for backup; and
providing the appended file name and the indexes to a backup engine to backup data blocks comprising the file, wherein the backed up indexes eliminate a need to traverse and mount a data saveset including the file to allow a user to perform a specific search operation.

17. The computer program product of claim 16 wherein the system comprises a Microsoft Windows based network, and wherein the file system is NTFS, and wherein the master file table (MFT) comprises records that represent corresponding files and folders in the NTFS system, and wherein an MFT zone location is stored in NTFS boot information.

18. The computer program product of 17, wherein the method further comprises:
parsing an NTFS boot record to obtain MFT zone location information for data blocks of the file; and
intersecting MFT zone blocks obtained in the parsing step with the changed data blocks, wherein the intersecting step comprises scanning and comparing a block location of the file table zone and received block identifiers to find matching blocks.

19. The computer program product of claim 18 wherein the method further comprises comparing a modification time for the each record to eliminate MFT records with corresponding access times that are also part of changed blocks.

20. The computer program product of claim 19 wherein the appended file name corresponds to a full file system path of the file as defined by the file system.

* * * * *